US012367812B2

(12) United States Patent
Yang

(10) Patent No.: US 12,367,812 B2
(45) Date of Patent: Jul. 22, 2025

(54) TRANSPARENT DISPLAY DEVICE AND METHOD FOR DRIVING THE SAME

(71) Applicant: LG Display Co., Ltd., Seoul (KR)

(72) Inventor: Changmo Yang, Paju (JP)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/388,292

(22) Filed: Nov. 9, 2023

(65) Prior Publication Data

US 2024/0177652 A1 May 30, 2024

(30) Foreign Application Priority Data

Nov. 24, 2022 (KR) ........................ 10-2022-0159165

(51) Int. Cl.
*G09G 3/32* (2016.01)

(52) U.S. Cl.
CPC ........... *G09G 3/32* (2013.01); *G09G 2310/08* (2013.01); *G09G 2320/0247* (2013.01); *G09G 2320/0626* (2013.01); *G09G 2330/021* (2013.01); *G09G 2360/14* (2013.01)

(58) Field of Classification Search
CPC ................. G09G 3/32; G09G 2310/08; G09G 2320/0247; G09G 2320/0626; G09G 2330/021; G09G 2360/14; G09G 3/003; G09G 2320/0261; G09G 2360/16; G09G 2380/10; G09F 19/14
See application file for complete search history.

(56) References Cited

U.S. PATENT DOCUMENTS

2015/0208486 A1* 7/2015 Yoon .................... H05B 47/115 315/153
2016/0104302 A1 4/2016 Lee et al.
2018/0267313 A1 9/2018 Kim et al.
2020/0267304 A1* 8/2020 Park ........................ H04N 23/76
2020/0288066 A1* 9/2020 Candelore .............. H04N 23/64
2021/0005160 A1 1/2021 Lee et al.
2021/0141229 A1* 5/2021 Mathur .............. G02B 27/0093
2022/0075183 A1* 3/2022 Lee ......................... B60K 35/10
2022/0257173 A1* 8/2022 Sharma ................ A61B 5/7267

FOREIGN PATENT DOCUMENTS

KR 10-2016-0042680 A 4/2016
KR 10-2018-0105402 A 9/2018
KR 10-2021-0004472 A 1/2021
KR 102217926 B1 * 2/2021 ........... H04B 10/506

* cited by examiner

*Primary Examiner* — Jeff Piziali
(74) *Attorney, Agent, or Firm* — Morgan, Lewis & Bockius LLP

(57) ABSTRACT

A transparent display device may include a display panel having a transmission area and a pixel area, a sensing element having a first camera for obtaining and supplying background image information about a rear background viewed through the transparent display device, and a timing controller configured to adjust a peak luminance of on-screen image information displayed on the display panel based on background complexity using the background image information supplied from the sensing element.

16 Claims, 16 Drawing Sheets

| | | Background Complexity | |
|---|---|---|---|
| | | Simple Background | Complex Background |
| Background Distance | Close Case | 150   Good Visibility | 160   Bad Visibility |
| | Distant Case | 170   Best Visibility | 180   Good Visibility |

902

904

TRANSPARENT DISPLAY DEVICE AND METHOD FOR DRIVING THE SAME

CROSS-REFERENCE TO RELATED APPLICATION

This application claims the benefit of and priority to Korean Patent Application No. 10-2022-0159165 filed on Nov. 24, 2022, the entirety of which is incorporated herein by reference for all purposes.

BACKGROUND

1. Technical Field

The present disclosure relates to a display device and particularly to, for example, without limitation, a transparent display device capable of improving visibility of on-screen image and a method for driving the same.

2. Discussion of the Related Art

With advancement of display devices, a transparent display device in which a user can see a background beyond a display panel on which an image is displayed is being developed.

A transparent display device may be utilized in a wide range of application fields, such as automobile glass, building glass, advertising boards, cooler doors, screen doors, and the like, whereby the user environments are diverse and numerous.

In a transparent display device, the background of a panel may be recognized along with an on-screen image displayed on the panel by the light transmissive characteristics. Thus, when the background seen through the panel becomes more complex, it can create a problem that reduces visibility of the on-screen image.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

Embodiments of the present disclosure are directed to a transparent display device that substantially obviates one or more of the problems due to limitations and disadvantages of the related art.

An aspect of one or more example embodiments of the present disclosure is to provide a transparent display device capable of improving visibility of an on-screen image by controlling a luminance of the device, and a method for driving the same.

An aspect of one or more example embodiments of the present disclosure is to provide a transparent display device capable of reducing power consumption by controlling a luminance of the device, and a method for driving the same.

In accordance with one or more aspects of the present disclosure, a transparent display device may include a display panel having a transmission area and a pixel area, a sensing element having a first camera, the sensing element for obtaining and supplying background image information about a rear background viewed through the transparent display device, and a timing controller configured to adjust a peak luminance of on-screen image information displayed on the display panel based on background complexity using the background image information supplied from the sensing element.

In the transparent display device according to one or more example embodiments of the present disclosure, the sensing element may further include a second camera configured to obtain background image depth information for the rear background viewed through the transparent display device and to provide the background image depth information to the timing controller.

In the transparent display device according to one or more example embodiments of the present disclosure, the sensing element may further include a distance sensor configured to obtain viewing distance information between the display panel and a viewing point and provide the obtained viewing distance information to the timing controller, and the timing controller may generate the background complexity using at least one of the background image information, the background image depth information, and the viewing distance information.

In accordance with one or more aspects of the present disclosure, a method for driving a transparent display device may include obtaining at least one of background image information, background image depth information, and viewing distance information. The background image information and the background image depth information may be for a rear background viewed through the transparent display device. The transparent display device may include a display panel having a transmission area and a pixel area. The viewing distance information may be information between the display panel and a viewing point. The method may further include adjusting a peak luminance of on-screen image information based on background complexity using at least one of the background image information, the background image depth information, and the viewing distance information. The method may further include displaying the on-screen image information with the adjusted peak luminance on the display panel.

In the transparent display device according to one or more example embodiments of the present disclosure and the method for driving the same, the peak luminance of the on-screen image information may be increased when the background image information becomes complex, and/or the peak luminance of the on-screen image information may be decreased when the background image information becomes simple.

In the transparent display device according to one or more example embodiments of the present disclosure and the method for driving the same, the peak luminance of the on-screen image information may be increased when the background image depth information becomes close, and/or the peak luminance of the on-screen image information may be decreased when the background image depth information becomes distant.

In the transparent display device according to one or more example embodiments of the present disclosure and the method for driving the same, the peak luminance of the on-screen image information may be increased when the viewing distance information becomes distant, and/or the peak luminance of the on-screen image information may be decreased when the viewing distance information becomes close.

In the transparent display device according to one or more example embodiments of the present disclosure and the method for driving the same, the peak luminance of the on-screen image information may be increased when the background complexity increases, and/or the peak luminance of the on-screen image information may be decreased when the background complexity decreases.

Other devices, methods, features and advantages will be, or will become, apparent to one with skill in the art upon examination of the drawings and detailed description herein. It is intended that all such devices, methods, features and advantages be included within this description, be within the scope of the present disclosure, and be protected by the following claims. Nothing in this section should be taken as a limitation on the claims. Further aspects and advantages are discussed below in conjunction with embodiments of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles of the disclosure. In the drawings.

Figure 1:
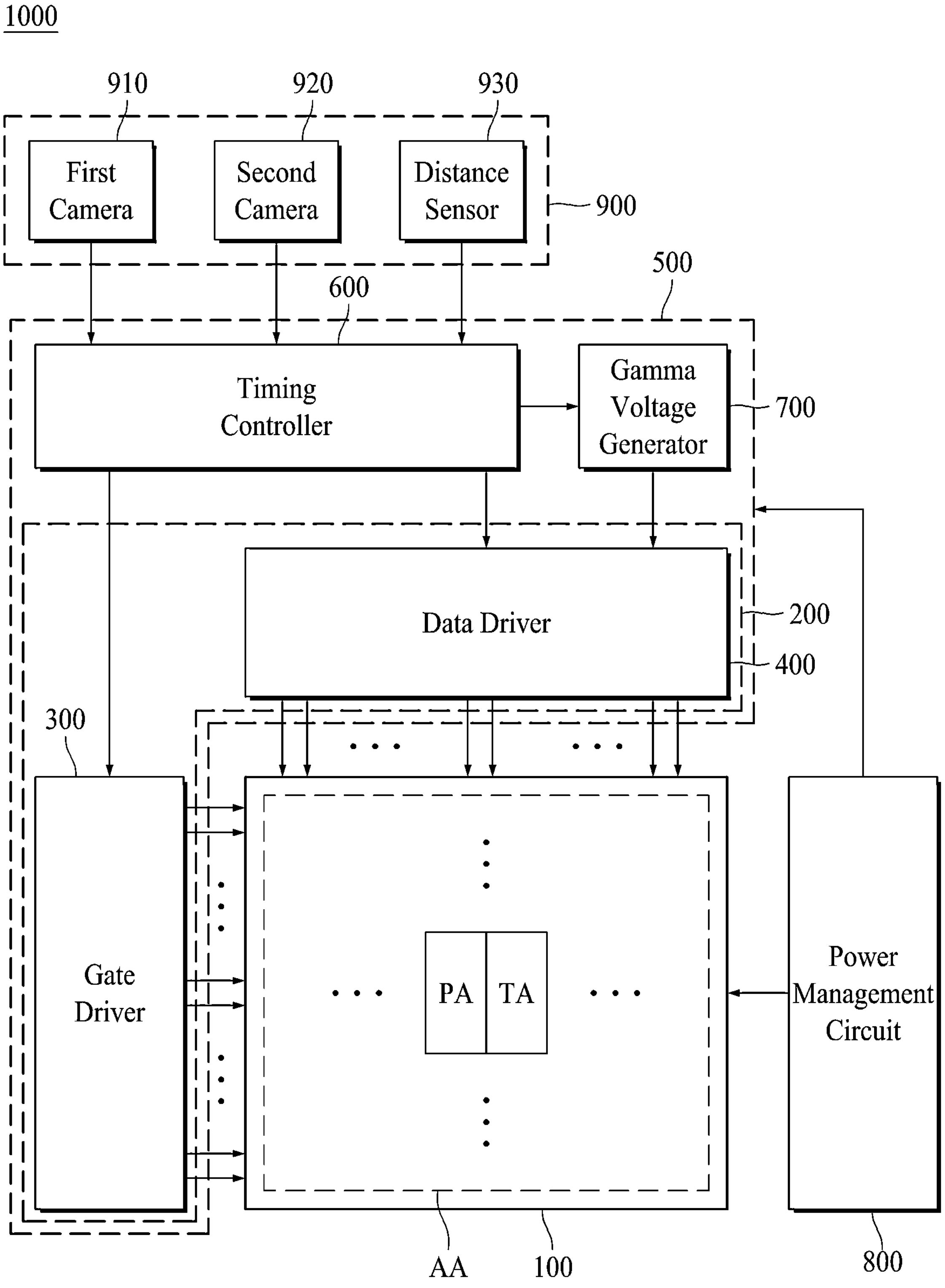
FIG. 1 is a block diagram illustrating a configuration of a transparent display device according to an example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure. Further, the present disclosure is defined by the scope of claims and their equivalents.

Shapes, dimensions (e.g., sizes, lengths, widths, heights, thicknesses, locations, radii, diameters, and areas), ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "constitute," "made of," "formed of," "composed of," or the like is used with respect to one or more elements, one or more other elements may be added unless a term such as "only" or the like is used. The terms used in the present disclosure are merely used in order to describe particular example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. "Embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, where the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of" or the like, one or more other parts may be located between the two parts unless a more limiting term, such as "immediate(ly)," "direct(ly)," or "close(ly)," is used. For example, when a structure is described as being positioned "on," "on a top of," "upon," "on top of," "over," "under," "above," "below," "beneath," "near," "close to," "adjacent to," "beside," "next to," or "at or on a side of" another structure, this description should be construed as including a case in which the structures contact each other directly as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

It is understood that, although the terms "first," "second," and the like may be used herein to describe various elements (e.g., layers, films, regions, components, sections, or the like), these elements should not be limited by these terms, for example, to any particular order, precedence, or number of elements. These terms are used only to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phrase "through" may be understood to be at least partially through or entirely through. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms "first direction," "second direction," and the like, such as the terms "horizontal direction," "vertical direction," "X-axis direction," "Y-axis direction," and "Z-axis direction," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise. In one or more aspects, unless stated otherwise, the term "nth" may refer to "nnd" (e.g., 2nd where n is 2), or "nrd" (e.g., 3rd where n is 3), and n may be a natural number.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

Figure 2:
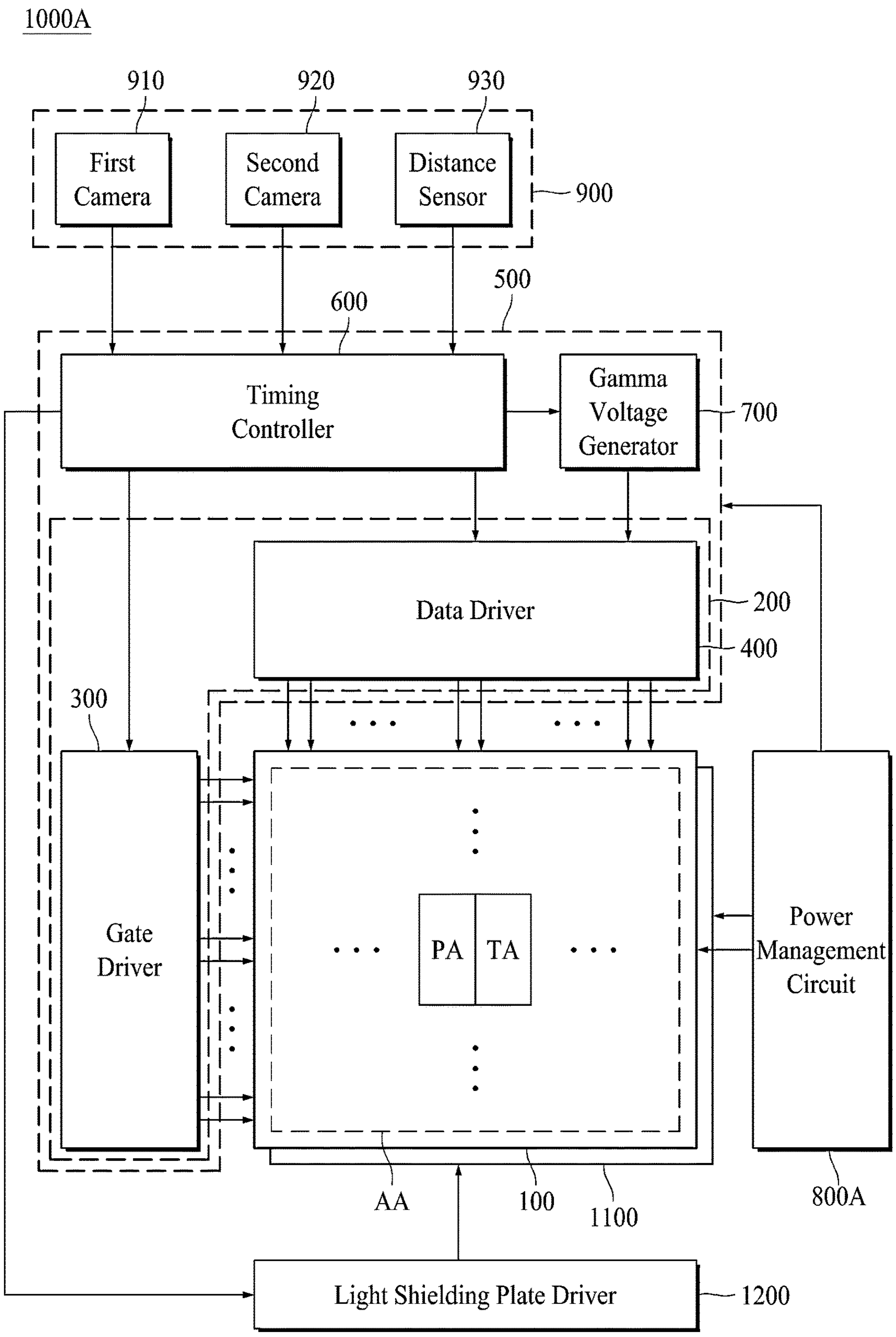
FIG. 2 is a block diagrams illustrating a configuration of a transparent display device according to an example embodiment of the present disclosure.
Figure 3:
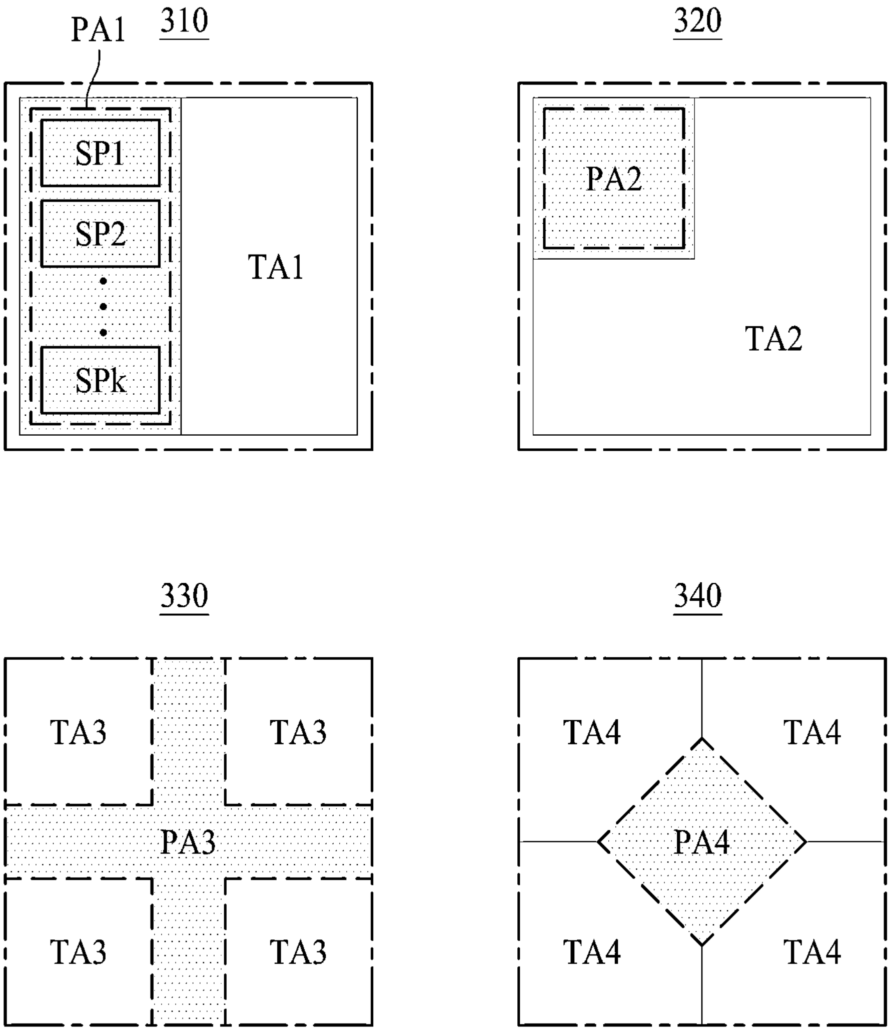
FIG. 3 schematically illustrates various pixel arrangement structures in a portion of a display panel according to an example embodiment of the present disclosure.
Figure 4:
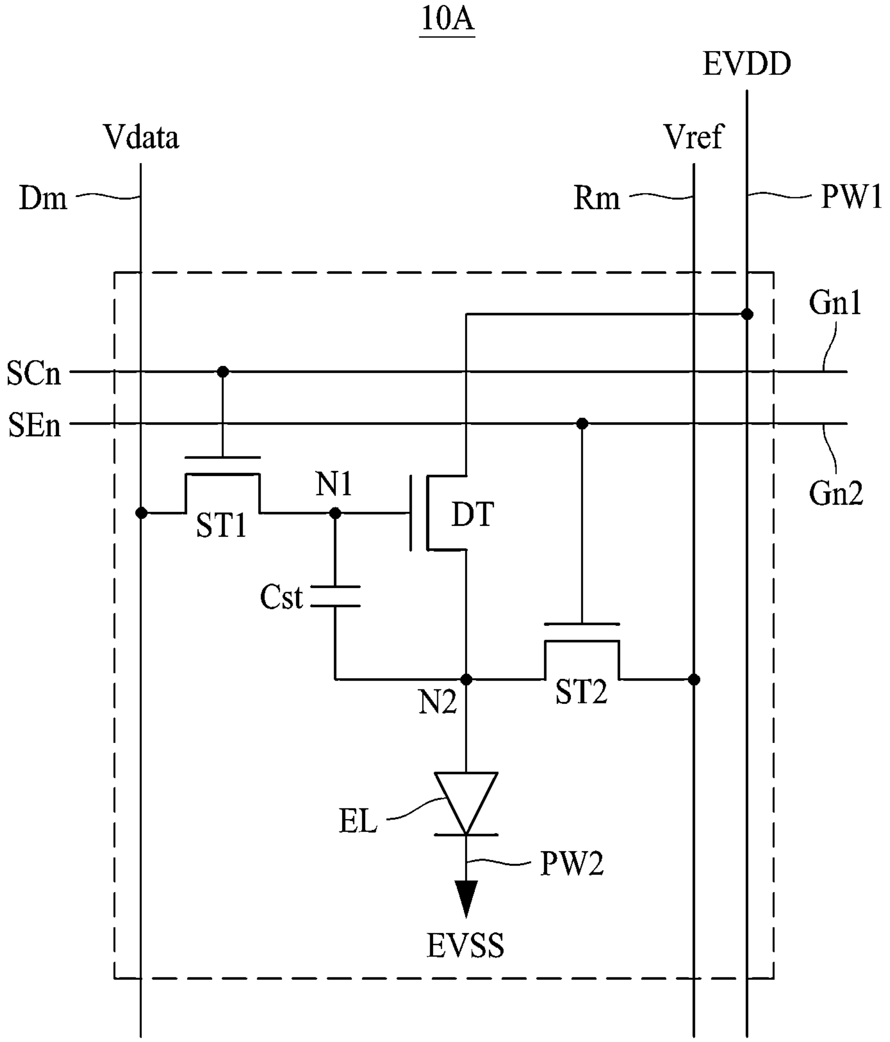
FIG. 4 is a circuit diagram illustrating a configuration of each subpixel according to an example embodiment of the present disclosure.
Figure 5:
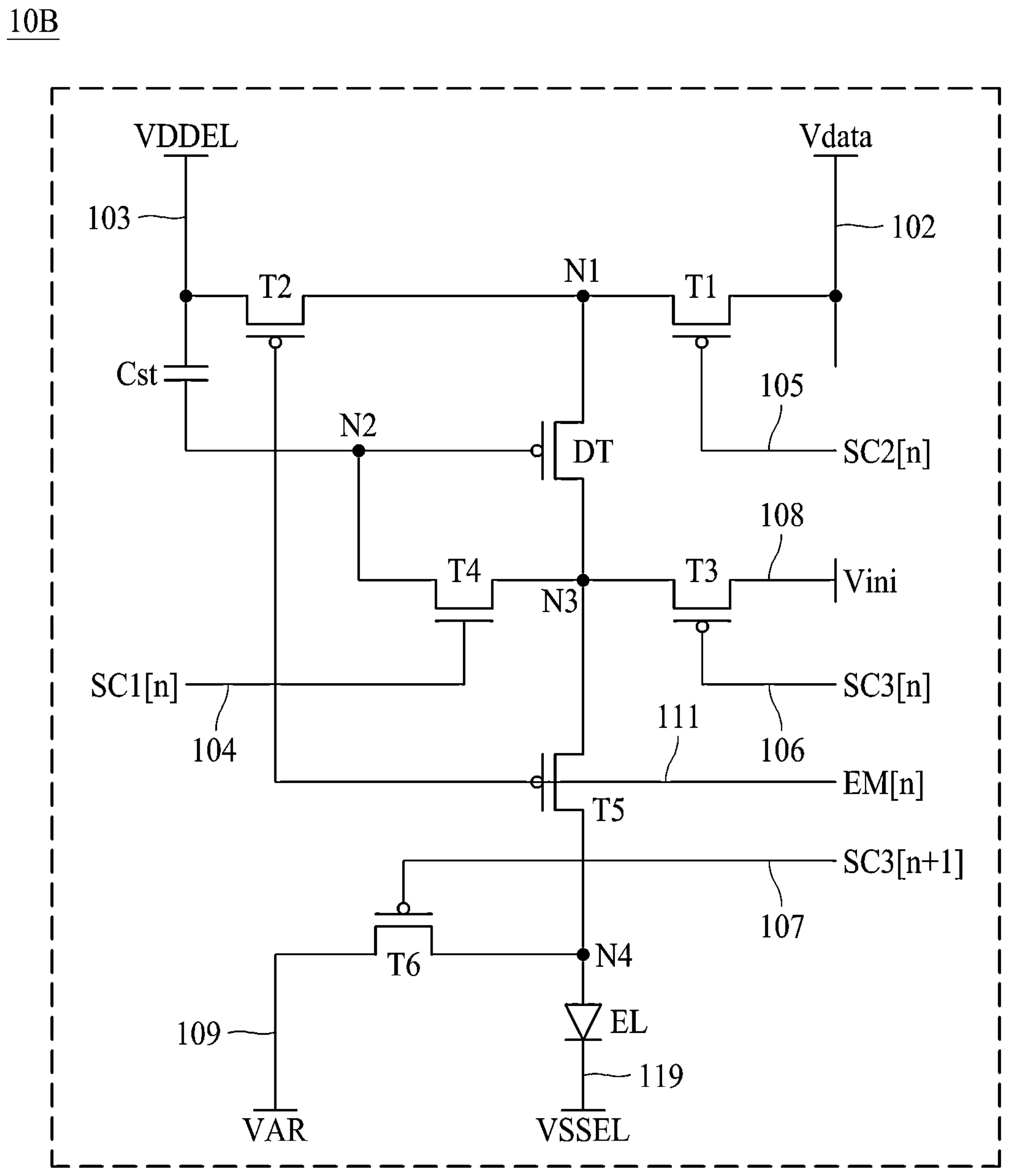
FIG. 5 is a circuit diagram illustrating a configuration of each subpixel according to an example embodiment of the present disclosure.

FIGS. 1 and 2 are block diagrams illustrating a configuration of a transparent display device according to an example embodiment of the present disclosure, FIG. 3 schematically illustrates various pixel arrangement structures in a portion of a display panel according to an example embodiment of the present disclosure, and FIGS. 4 and 5 are circuit diagrams illustrating a configuration of each subpixel according to an example embodiment of the present disclosure.

A display device 1000 according to an example embodiment of the present disclosure may be configured or applied with a liquid crystal display device or an electroluminescent display device using a self-luminous element. An organic light emitting diode (OLED) display device, a quantum dot light emitting diode display device, or an inorganic light emitting diode display device may be included in or applied to the electroluminescent display device. A micro light emitting diode display device may be included in or applied to the display device 1000 according to an example embodiment of the present disclosure.

Referring to FIGS. 1 and 2, the display device 1000 may include a display panel 100, a gate driver 300, a data driver 400, a timing controller 600, a gamma voltage generator 700, and a power management circuit 800 or 800A. The gate driver 300 and the data driver 400 may be collectively referred to as a panel driver 200 for driving the display panel 100. The gate driver 300, the data driver 400, the timing controller 600, and the gamma voltage generator 700 may be collectively referred to as a display driver 500.

Referring to FIG. 2, the display device 1000 may further include a light shielding plate 1100 overlapped with a rear surface of the display panel 100, and a light shielding plate driver 1200 for driving the light shielding plate 1100.

Referring to FIGS. 1 and 2, the display panel 100 may be a flexible display panel enabling a shape change, for example, a rigid display panel, a foldable display panel, a rollable display panel, a rollable display panel, and/or a stretchable display panel.

The display panel 100 is a transparent display panel capable of viewing a rear background through the display panel 100. The display panel 100 may include a display area AA having a plurality of pixel areas PA displaying an on-screen image and a plurality of transmission areas TA transmitting light therethrough. The display panel 100 may be a panel in which a touch sensor screen overlapping with the display area AA is embedded or attached. The pixel area PA may be sometimes referred to as a light emitting area. The transmission area TA may be sometimes referred to as a transparent area.

The display area AA of the display panel 100 may include the pixel area PA and the transmission area TA with various arrangement structures.

For example, the display area AA may include at least one of unit regions 310, 320, 330, and 340 of various arrangement structures shown in FIG. 3. In addition, the display area AA may include unit regions of other arrangement structures. In the display area AA, at least one of the various unit regions 310, 320, 330, and 340 may be arranged in a matrix configuration along a first direction and a second direction. The first direction may be one of an X-axis direction (horizontal direction) and a Y-axis direction (vertical direction), and the second direction may be the other thereof.

Referring to FIG. 3, the unit region 310 may include the pixel area PA1 with a plurality of subpixels SP1~SPk ("k" is an integer equal to or more than 2) arranged therein, and the transmission area TA1 disposed adjacent to the pixel area PA1 in the first direction. The pixel area PA1 and the transmission area TA1 in the unit region 310 may be changed in position. Each of the plurality of subpixels SP1~SPk may emit any one of red, green, blue, and white light. The transmission area TA1 may have the same size as the pixel area PA1 or may have a size smaller or larger than the pixel area PA1.

Referring to FIG. 3, the unit region 320 may include the pixel area PA2, and the transmission area TA2 disposed adjacent to the pixel area PA2 in the first and second directions, and a third direction (diagonal direction). The pixel area PA2 may include a plurality of subpixels SP1~SPk. The transmission area TA2 may have a size greater than that of the pixel area PA2.

Referring to FIG. 3, the unit region 330 may include the pixel area PA3 disposed in a cross shape, and the transmission area TA3 disposed adjacent to the pixel area PA3 in a first bidirectional direction and a second bidirectional direction. The pixel area PA3 may include a plurality of subpixels SP1~SPk. The transmission area TA3 may have a size greater than that of the pixel area PA3.

Referring to FIG. 3, the unit region 340 may include the pixel area PA4 disposed in a diamond shape and the transmission area TA4 disposed to surround the pixel area PA4. The pixel area PA4 may include a plurality of subpixels SP1~SPk. The transmission area TA4 may have a size greater than that of the pixel area PA4.

Each of the plurality of subpixels SP1~SPk may include a light emitting element and a pixel circuit for independently driving the light emitting element. The light emitting element may include an organic light emitting diode, a quantum dot light emitting diode, or an inorganic light emitting diode. The pixel circuit may include various thin film transistors (TFTs) including a driving TFT for driving the light emitting element and a switching TFT for transmitting a data signal to the driving TFT, and a storage capacitor for storing a driving voltage of the driving TFT. The pixel circuit is electrically connected to signal lines including a gate line, a data line, a power line, and the like disposed on the display panel 100.

The power management circuit 800 and 800A may generate and output various driving voltages required for driving all components of the transparent display device, that is, various driving voltages required for an operation of the display panel 100 and the display driver 500 by using an input voltage supplied from external components. The power management circuit 800A may further supply a driving voltage required for driving the light shielding plate 1100 and the light shielding plate driver 1200.

The gate driver 300 may be controlled according to a plurality of gate control signals supplied from the timing controller 600 and may individually drive the gate lines of the display panel 100. The gate driver 300 may supply a scan signal of a gate-on voltage to the corresponding gate line during a driving period of each gate line, and may supply a gate-off voltage to the corresponding gate line during a non-driving period of each gate line. The gate driver 300 may be embedded in a bezel area of the display panel 100 in the form of gate-in-panel (GIP) type formed with the TFTs of the display area AA.

The gate driver 300 embedded in the display panel 100 may receive the plurality of gate control signals from the timing controller 600 via a level shifter (not shown). The level shifter (not shown) may receive the control signals from the timing controller 600 and perform level shifting or logic processing to generate the plurality of gate control signals and supply the gate control signals to the gate driver 300.

The gamma voltage generator 700 may generate a plurality of reference gamma voltages having different gamma voltage levels and supply the reference gamma voltages to the data driver 400. The gamma voltage generator 700 may generate the plurality of reference gamma voltages corresponding to the gamma characteristics of the display device under the control of the timing controller 600 and may supply the reference gamma voltages to the data driver 400. The gamma voltage generator 700 may adjust a reference gamma voltage level according to gamma data supplied from the timing controller 600 and may output the reference gamma voltage level to the data driver 400. The gamma voltage generator 700 may adjust a high potential power voltage, which is a maximum gamma voltage, according to a peak luminance control from the timing controller 600, may adjust the plurality of reference gamma voltages according to the adjusted high potential power voltage, and may output the adjusted reference gamma voltages to the data driver 400.

The data driver 400 may be controlled according to a data control signal supplied from the timing controller 600 and may convert digital data supplied from the timing controller 600 to an analog data signal by using a digital-to-analog conversion circuit. The data driver 400 may subdivide the plurality of reference gamma voltages supplied from the gamma voltage generator 700 into grayscale voltages and may convert the digital data to the analog data signal by using the subdivided grayscale voltages. The data driver 400 may supply the converted data signal to the data line of the display panel 100.

In addition, the data driver 400 may supply a reference voltage to a reference line of the display panel 100 under the control of the timing controller 600. The data driver 400 may divide the reference voltage into a displaying reference voltage and a sensing reference voltage and may dividedly supply the displaying reference voltage and the sensing reference voltage under the control of the timing controller 600.

Under the control of the timing controller 600, the data driver 400 may sense the signal in which the driving characteristics of each subpixel SP1~SPk are reflected through the reference line by the use of a sensor in a voltage sensing method or a current sensing method.

The timing controller 600 may receive source image data and timing control signals from a host system. The host system may be any one of a computer, a television (TV) system, a set-top box, a system of a portable terminal such as a tablet or a mobile phone, or a system of a vehicle. The timing control signals may include a dot clock, a data enable signal, a vertical synchronization signal, a horizontal synchronization signal, and the like.

The timing controller 600 may control the gate driver 300 and the data driver 400 by using the timing control signals supplied from the host system and timing setting information stored therein. The timing controller 600 may generate the plurality of gate control signals for controlling the driving timing of the gate driver 300 and supply the gate control signals to the gate driver 300. The timing controller 600 may generate the plurality of data control signals for controlling the driving timing of the data driver 400 and supply the data control signals to the data driver 400.

The timing controller 600 may perform various image processing, including image quality correction, deterioration correction, and luminance correction for reducing power consumption with respect to the source image data supplied from the host system and may supply the image-processed data to the data driver 400.

According to one or more example embodiments of the present disclosure, the timing controller 600 may be a timing controller typically used in the display field, may be a control device including a timing controller and able to perform other control functions, or may be a circuit in a control device. The timing controller 600 may be implemented using one or more of a variety of circuits or electronic components, such as an integrated circuit (IC), a field programmable gate array (FPGA), an application specific integrated circuit (ASIC), a processor, or the like. In some examples, the timing controller 600 may be mounted on a printed circuit board (PCB), a flexible printed circuit (FPC), or the like.

The timing controller 600 may use a peak luminance control (PLC) method to control a peak luminance of the on-screen image based on the characteristics of a source image. The timing controller 600 may determine an average picture level (APL) of the source image data and may lower the peak luminance according to the increase of APL, to thereby reduce the power consumption.

The timing controller 600 may further adjust the peak luminance according to the external illuminance.

According to an example embodiment of the present disclosure, the timing controller 600 may determine the complexity (which may be sometimes referred to as background complexity) for the rear background of the display panel 100 by using a sensing element 900 and may determine the peak luminance of the on-screen image according to the background complexity.

According to an example embodiment of the present disclosure, the timing controller 600 may receive image information (which may be sometimes referred to as background image information) for the rear background of the display panel 100 and distance information (which may be sometimes referred to as background image depth information) for the rear background from the sensing element 900. The timing controller 600 may determine the background complexity for the rear background by using at least one of the background image information and the background image depth information. In one or more aspects, image information may sometimes represent an image and vice versa. In one or more aspects, on-screen image information may sometimes represent an on-screen image and vice versa. In one or more aspects, on-screen image information may sometimes represent information about an on-screen image.

The timing controller 600 according to an example embodiment may determine a viewing distance between the display panel 100 and a viewing point by using the sensing element 900 and may determine the peak luminance of the on-screen image according to the viewing distance. The timing controller 600 may be supplied with viewing distance information of a viewing point from the sensing element 900. In one or more examples, a viewing point may be a location of a viewer. A viewer may observe images displayed on the display panel 100. For example, a viewer may be located in front of (or near a side of) the display panel 100 and may see the on-screen images displayed in the pixel areas PA of the display panel 100. The viewing distance information may represent (or relate to) the distance between the display panel 100 (or the transparent display device 1000) and the viewing point, or may represent (or relate to) information about such distance.

According to an example embodiment of the present disclosure, the timing controller 600 may determine the background complexity and viewing distance information by using the sensing element 900 and may determine the peak luminance of the on-screen image based on at least one of background complexity and viewing distance information.

The sensing element 900 may include at least one of a first camera 910, a second camera 920, and a distance sensor 930.

The first camera 910 may photograph the rear background of the display panel 100 to obtain the background image and may supply the obtained background image information to the timing controller 600. The first camera 910 may be represented by a red-green-blue (RGB) camera. The first camera 910 may be mounted in a rear bezel area of the transparent display device.

The second camera 920 may photograph the depth of the rear background of the display panel 100 to obtain the depth image and may supply the obtained background image depth information to the timing controller 600. The second camera 920 may be represented by a depth camera. The second camera 920 together with the first camera 910 may be mounted at or on the rear bezel area of the transparent display device.

In one or more examples, when the distance between the display panel 100 (or the transparent display device 1000) and the rear background becomes close, the background image depth information may become close. In one or more examples, when the distance between the display panel 100 (or the transparent display device 1000) and the rear background becomes distant, the background image depth information may become distant.

The distance sensor 930 senses the distance between the display panel 100 (or the transparent display device 1000) and the viewing point and supplies the sensed viewing distance information to the timing controller 600. The distance sensor 930 may be mounted in a front bezel area of the transparent display device.

The timing controller 600 according to an example embodiment of the present disclosure may determine the background complexity based on at least one of background image information, background image depth information, and viewing distance information supplied from the sensing element 900 and then may determine the peak luminance of the on-screen image according to the determined background complexity.

For example, the timing controller 600 may set the high peak luminance as the background image information becomes complex and the background image depth information becomes close, that is, the background complexity increases, to thereby improve visibility of the on-screen image.

The timing controller 600 may set low high peak luminance as the background image information becomes simple and the background image depth information becomes far, that is, the background complexity decreases, to thereby reduce the power consumption.

The timing controller 600 may set the peak luminance to be high when the viewing distance increases so as to improve visibility of the on-screen image, and may set the leak luminance to be low when the viewing distance decreases so as to reduce the power consumption.

The timing controller 600 may generate a peak luminance control signal based on at least one of the characteristics of APL, illuminance, background complexity, and viewing distance of the source image. The timing controller 600 may control at least one of the image data, the maximum gamma voltage of the gamma voltage generator 700, and the high potential power voltage EVDD of the power management circuit 800 supplied to the display panel 100 by using the peak luminance control signal, thereby adjusting the peak luminance of the on-screen image displayed on the display panel 100.

Referring to FIG. 2, the transparent display apparatus may operate in an on-screen important mode and a see-through important mode by controlling light transmittance of the light shielding plate 1100.

In the on-screen important mode, according to the control of the timing controller 600, the light shielding plate driver 1200 may drive the light shielding plate 1100 in a light shielding mode in which black is displayed. Accordingly, the display panel 100 displays the on-screen image using the pixel areas PA on the black background of the light shielding plate 1100 visible through the transmission area TA, thereby improving visibility of the on-screen image.

In the see-through important mode, the light shielding plate driver 1200 may drive the light shielding plate 1100 in a transmission mode under the control of the timing controller 600. Accordingly, the viewer may see the on-screen image displayed by the pixel areas PA together with the rear background seen through the light shielding plate 1100 and the transmission area TA of the display panel 100.

In the see-through important mode, the timing controller 600 may adjust the peak luminance of the on-screen image based on at least one of the background complexity and the viewing distance.

FIG. 4 is a circuit diagram illustrating a configuration of each subpixel according to an example embodiment of the present disclosure.

Referring to FIG. 4, each subpixel 10A may include a pixel circuit provided with a light emitting element EL connected between a first power line PW1 for supplying a high potential driving voltage EVDD (first power voltage) and a second power line PW2 for supplying a low potential driving voltage EVSS (second power voltage), first and second switching TFTs ST1 and ST2 and a driving TFT DT for independently driving the light emitting element EL, and a storage capacitor Cst.

The light emitting element EL may include an anode connected to a source node N2 of the driving TFT DT, a cathode connected to the second power line PW2, and an organic light emitting layer between the anode and the cathode. The anode may be independently provided for each subpixel. However, the cathode may be a common electrode which is shared by all of the subpixels. When a driving current is supplied from the driving TFT DT, electrons are injected into the organic light emitting layer from the cathode, and holes are injected into the organic light emitting layer from the anode, whereby fluorescent or phosphorescent materials emit light through the bond of electrons and holes in the organic light emitting layer, thereby generating light of a luminance proportional to a current value of the driving current.

The first switching TFT ST1 may be driven by a scan gate signal SCn supplied to the first gate line Gn1 from the gate driver 300, and the first switching TFT ST1 may supply a data voltage Vdata supplied from the data driver 400 to the data line Dm to the gate node N1 of the driving TFT DT.

The second switching TFT ST2 may be driven by a sense gate signal SEn supplied from the gate driver 300 to the second gate line Gn2, and the second switching TFT ST2 may supply the reference voltage Vref supplied from the data driver 400 to the reference line Rm to the source node N2 of the driving TFT DT. Meanwhile, in the sensing mode, the second switching TFT transistor ST2 may provide a current in which the characteristics of the driving TFT DT or the light emitting element EL is reflected to the reference line Rm.

The first and second switching TFTs ST1 and ST2 may be controlled by the different gate lines Gn1 and Gn2 as shown in FIG. 3 or may be controlled by the same gate line.

The storage capacitor Cst connected between the gate node N1 and the source node N2 of the driving TFT DT may charge the driving voltage Vgs of the driving TFT DT with a difference voltage between the data voltage Vdata and the reference voltage Vref supplied to the gate node N1 and the source node N2 through the first and second switching TFTs ST1 and ST2, and may hold the driving voltage Vgs charged for an emission period in which the first and second switching TFTs ST1 and ST2 are turned off.

The driving TFT DT may control an emission intensity of the light emitting element EL by controlling the current Ids flowing to the light emitting element EL according to the driving voltage Vgs charged in the storage capacitor Cst.

In FIG. 4, the gate lines Gn1 and Gn2 may be driven by the gate driver 300, and the data and reference lines Dm and Rm may receive the data voltage Vdata and the reference voltage Vref, respectively, from the data driver 400. The power lines PW1 and PW2 may receive the high potential driving voltage EVDD and the low potential driving voltage EVSS, respectively, from the power management circuit 800 or 800A.

FIG. 5 is a circuit diagram illustrating a configuration of each subpixel according to an example embodiment of the present disclosure.

Referring to FIG. 5, a pixel circuit of each subpixel 10B may include a light emitting element EL, a driving TFT DT for supplying a current to the light emitting element EL, a plurality of TFTs T1~T6, and a storage capacitor Cst. The TFTs of each pixel circuit may be TFTs using any one of polysilicon semiconductor, amorphous silicon semiconductor, and oxide semiconductor.

For example, the driving TFT DT and the TFTs T1~T6 may be formed of polysilicon TFTs of P-type channel using polysilicon with high mobility.

Meanwhile, in an example illustrated in FIG. 5, the driving TFT DT and the TFTs T1~T3, T5, and T6 may be formed of polysilicon TFTs of P-type channel, and the compensation TFT T4 connected to the driving TFT DT in a diode structure may be configured as an oxide TFT of N-type channel using oxide semiconductor whose leakage current is smaller than that of polysilicon. When a screen update speed is relatively slow, the fourth switching TFT T4 may prevent a flicker by blocking the leakage current.

The light emitting element EL may include an anode connected to a drain electrode of the driving TFT DT via the emission control TFT T5, a cathode connected to a second power electrode 119 for supplying a second power voltage VSSEL, and an organic light emitting layer between the anode and the cathode. The light emitting element EL may generate light with luminance proportional to a current value of a driving current supplied from the driving TFT DT.

The compensation TFT T4 may connect a second node N3 controlled by a first gate line 104 and connected to a gate electrode of the driving TFT DT with a third node N3 connected to a drain electrode of the driving TFT DT. The compensation TFT T4 is turned on by a gate-on voltage of a first gate signal SC1[n] supplied through the first gate line 104, and is configured to connect the gate electrode and drain electrode of the driving TFT DT to each other, whereby the driving TFT DT may be connected in a diode structure. The first gate line 104 may be shared by two row lines, that is, the (n−1)th and (n)th row lines (where "n" is an integer equal to or more than 2). As a result, it is possible to reduce the bezel size and the size of the gate driver 300 embedded in the bezel area of the display panel 100.

The switching TFT T1 may be controlled by a second gate line 105 and is configured to connect a data line 102 to a first node N1 connected to a source electrode of the driving TFT DT. The switching TFT T1 may be turned on by a gate-on voltage of a second gate signal SC2[n] supplied through the second gate line 105, and may be configured to supply the data voltage Vdata supplied through the data line 102 to the source electrode of the driving TFT DT.

The operation control TFT T2 may be controlled by an emission control line 111 and is configured to connect a first power line VDDEL to the first node N1 connected to the source electrode of the driving TFT DT. The operation control TFT T2 may be turned on by a gate-on voltage of an emission control signal EM[n] supplied through the emission control line 111 and may be configured to supply a first power voltage VDDEL supplied through a first power line 103 to the source electrode of the driving TFT DT.

The light emission control TFT T5 may connect the third node N3 controlled by the emission control line 111 and connected to the drain electrode of the driving TFT DT to a fourth node N4 connected to the anode electrode of the light emitting element EL. The light emission control TFT T5 may be turned on by the gate-on voltage of the emission control signal EM[n] supplied through the emission control line 111 and may be configured to connect the drain electrode of the driving TFT DT to the anode electrode of the light emitting element EL.

The first initialization TFT T3 may be controlled by a third gate line 106 and is configured to connect the third node N3 connected to the drain electrode of a driving TFT DT to a first initialization line 108. The first initialization TFT T3 may be turned on by a gate-on voltage of a second gate signal SC3[n] supplied through the third gate line 106 and may be configured to supply a first initialization voltage *Vini* supplied through the first initialization line 108 to the third node N3 connected to the drain electrode of the driving TFT DT.

The second initialization TFT T6 may be controlled by a fourth gate line 107 and may be configured to connect a second initialization line 109 to the fourth node N4 connected to the anode of the light emitting element EL. The second initialization TFT T6 may be turned on by a gate-on voltage of a fourth gate signal supplied through the fourth gate line 107 and may be configured to supply a second initialization voltage VAR (anode reset voltage) supplied through the second initialization line 109 to the fourth node N4 connected to the anode electrode of the light emitting element LED. The fourth gate line 107 may share the third gate line for supplying a third gate signal SC3[n+1] in the (n+1)th row line (where "n" is a positive integer).

The storage capacitor Cst may be connected between the first power line 103 and the second node N2 connected to the gate electrode of the driving TFT DT. The storage capacitor Cst may store or charge a difference voltage between the first power supply voltage VDDEL supplied through the first power line 103 and the data voltage Vdata supplied to the second node N2 via the switching TFT T2 and the driving TFT DT and the compensation TFT T1 from the data line 102. While the driving TFT DT is connected in the diode structure via the compensation TFT T4, the storage capacitor Cst may sample and store a threshold voltage Vth of the driving TFT DT, and may provide the data voltage Vdata+Vth compensated with the threshold voltage Vth to the gate electrode of the driving TFT DT. Accordingly, the storage capacitor Cst may store or charge the difference voltage between the first power voltage VDDEL and the data voltage Vdata in which threshold voltage Vth of the driving TFT DT is compensated with a target voltage, and may provide the charged target voltage to the driving voltage Vgs between the gate and source electrodes of the driving TFT DT. Therefore, the characteristic deviation of the driving TFT DT between the subpixels may be compensated.

The driving TFT DT may control the current Ids to flow to the light emitting element EL according to the driving voltage charged in the storage capacitor Cst, thereby controlling the emission intensity of the light emitting element EL.

In FIG. 5, the gate lines 104, 105, 106, and 107 may be driven by the gate driver 300, and the emission control line 111 may be driven by the emission control driver (not shown) disposed in a bezel area of the display panel 100 together with the gate driver 300. The data voltage Vdata may be supplied from the data driver 400. The first power voltage VDDEL, the second power voltage VSSEL, the first initialization voltage Vini, and the second initialization voltage VAR may be supplied from the power management circuit 800 or 800A.

Figure 6:
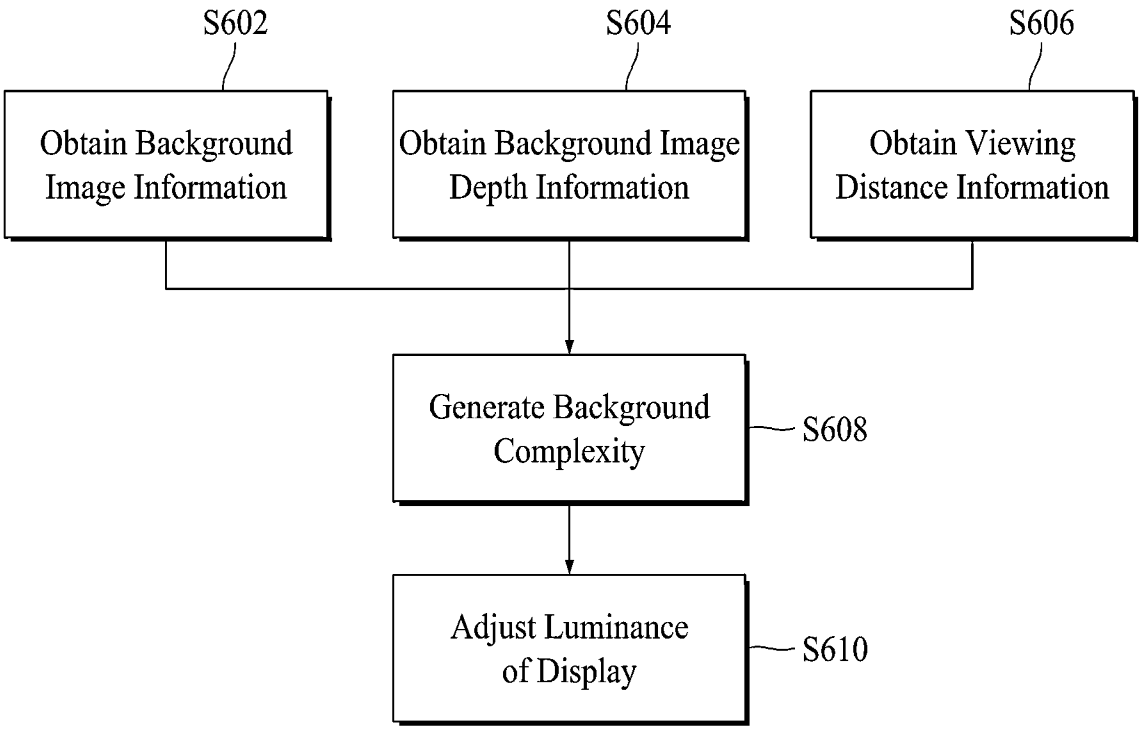
FIG. 6 is a diagram illustrating a driving method of the transparent display device according to an example embodiment.
Figure 7:
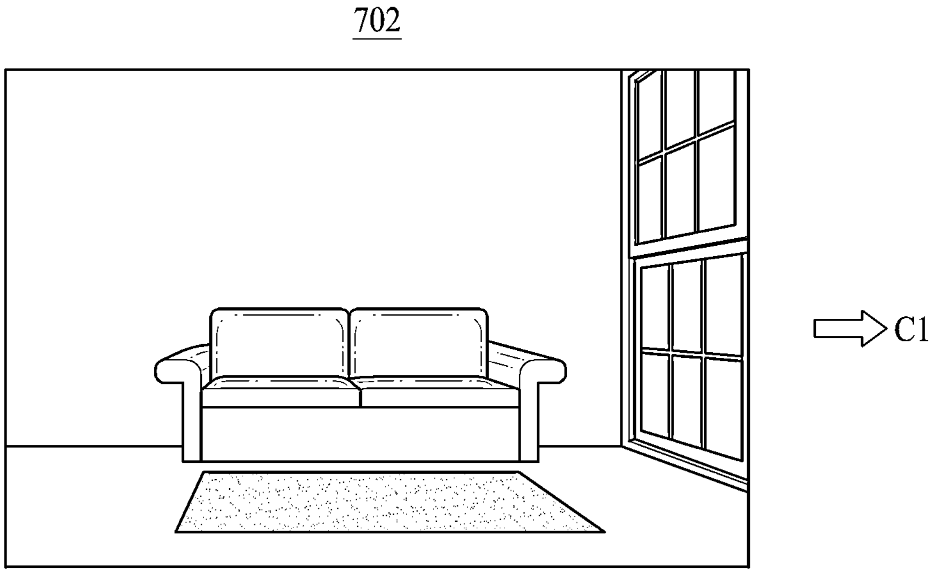
FIG. 7 is a diagram illustrating a background image having different complexities in the transparent display device according to an example embodiment.
Figure 7:
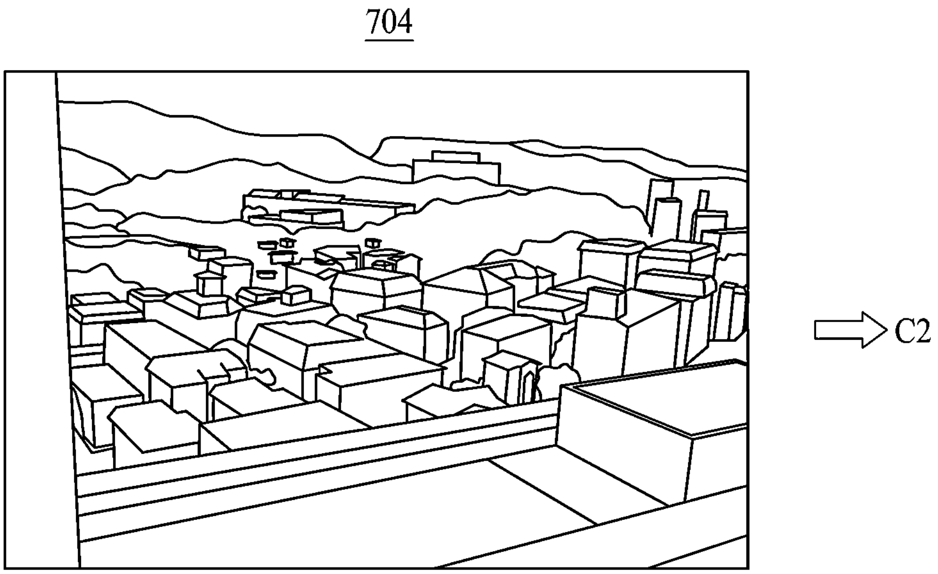
Figure 8:
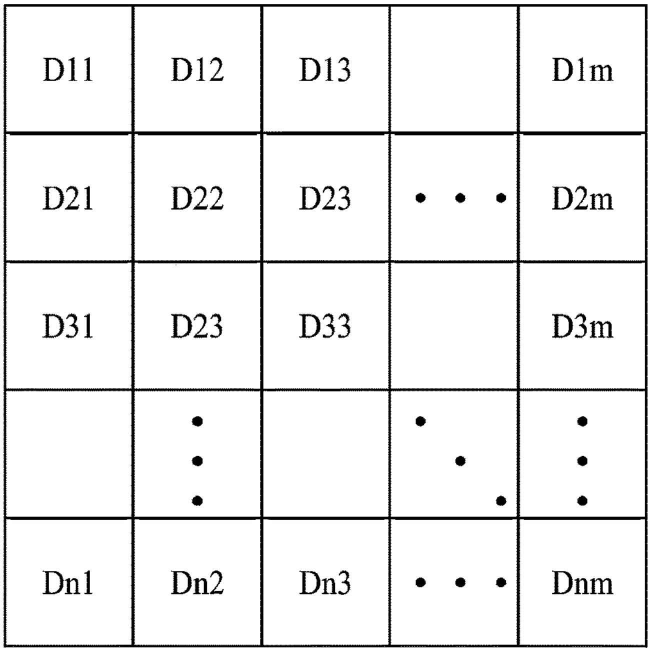
FIG. 8 is a diagram illustrating a method of generating the background complexity in the transparent display device according to an example embodiment.

FIG. 6 is a diagram illustrating a driving method of the transparent display device according to an example embodiment, FIG. 7 is a diagram illustrating a background image having different complexity in the transparent display device according to an example embodiment, and FIG. 8 is a diagram illustrating a method of generating the background complexity in the transparent display device according to an example embodiment.

A method for driving the transparent display apparatus shown in FIG. 6 is described with reference to the transparent display device illustrated in FIGS. 1 and 2.

Referring to FIGS. 1, 2, and 6, the sensing element 900 may acquire the background image information, background image depth information, and viewing distance information of the rear background and may supply the acquired background image information, background image depth information, and viewing distance information to the timing controller 600 (S602, S604, and S606).

The timing controller 600 may generate the background complexity based on at least one of the background image information, background image depth information, and viewing distance information supplied from the sensing element 900 (S608).

Referring to FIG. 7, the timing controller 600 may generate the first background complexity C1 by analyzing the first background image information 702 corresponding to a simple image illustrated in FIG. 7 and may generate the second background complexity C2 by analyzing the second background image information 704 corresponding to a complex image.

Referring to FIG. 8, the timing controller 600 may generate complexity for each of the plurality of regions D11~Dnm from the background image information. The timing controller 600 may generate the depth for each of the plurality of regions D11~Dnm from the background image depth information. The timing controller 600 may use the complexity for each region, the depth for each region, or the complexity and depth for each region to generate the background complexity C1 and C2.

The timing controller 600 may adjust the background complexity C1 and C2 by additionally reflecting the viewing distance information.

The timing controller 600 may control the luminance of the transparent display device by adjusting the peak luminance of the on-screen image according to the background complexity C1 and C2 (S610).

The timing controller 600 may generate the peak luminance control signal according to the background complexity C1 and C2. The timing controller 600 controls at least one of the image data, the maximum gamma voltage of the gamma voltage generator 700, and the high potential power voltage EVDD of the power management circuit 800 or 800A supplied to the display panel 100 by using the peak luminance control signal, thereby adjusting the peak luminance of the on-screen image displayed on the display panel 100.

Figure 9:
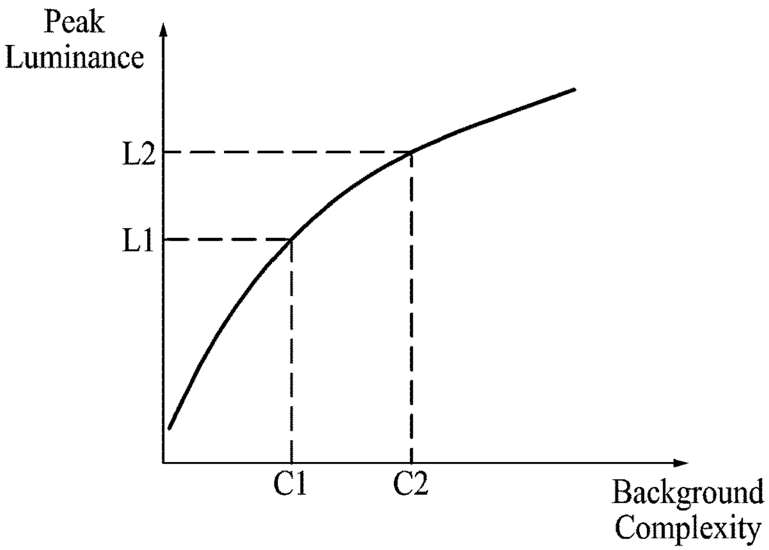
FIG. 9 is a graph illustrating a relationship between background complexity and peak luminance in the transparent display device according to an example embodiment of the present disclosure.

FIG. 9 is a graph illustrating a relationship between background complexity and peak luminance in the transparent display device according to an example embodiment of the present disclosure.

Referring to FIG. 9, as the background complexity C1 and C2 increases, it has a proportional relationship in which the peak luminance L1 and L2 increases.

For example, as the background image information becomes simple, the background image depth information becomes far, or the viewing distance becomes close, the background complexity C1 decreases, and the peak luminance L1 may be reduced. As the background image information becomes complicated, the background image depth information becomes close, or the viewing distance becomes far, the background complexity C2 increases, and the peak luminance L2 may be increased.

Figure 10:
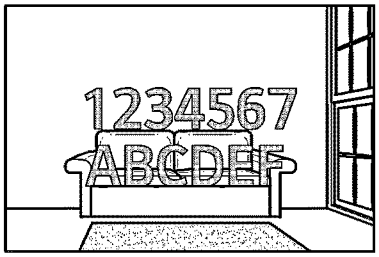
FIG. 10 illustrates visibility results of on-screen images according to background complexity and background distance in a transparent display device according to a comparative example.
Figure 10:
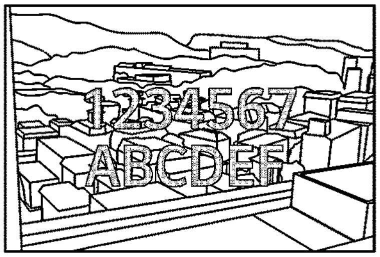
Figure 10:
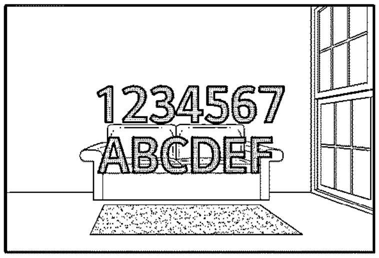
Figure 10:
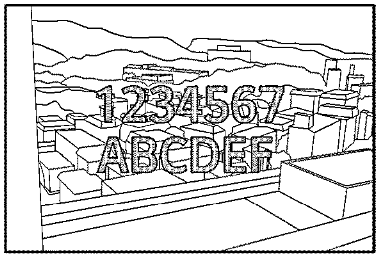

FIG. 10 illustrates visibility results of on-screen images according to background complexity and background distance in a transparent display device according to a comparative example.

Referring to FIG. 10, the visibility of on-screen images may be recognized in three cases, that is, a first case 150 when a rear background viewed through the transparent display device according to the comparative example is simple and close, a second case 170 when a rear background viewed through the transparent display device according to the comparative example is simple and distant, and a third case 180 when a rear background viewed through the transparent display device according to the comparative example is complex and distant. Meanwhile, if a rear background viewed through the transparent display device according to the comparative example is complex and close 160, the visibility of an on-screen image may be degraded.

Figure 11:
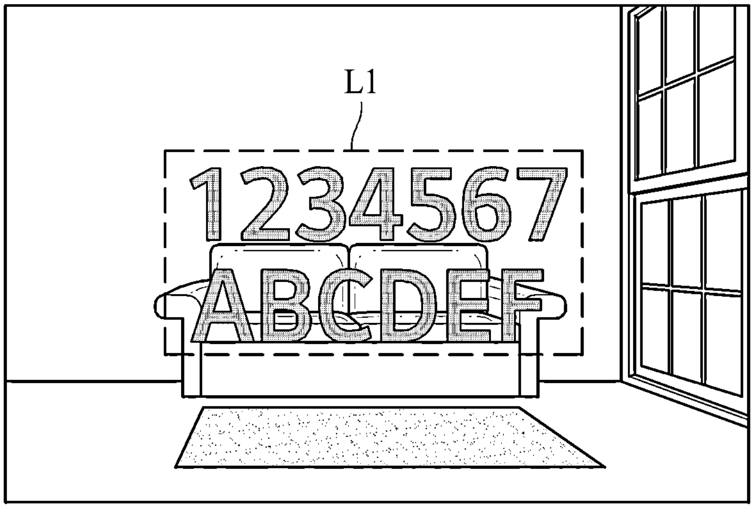
FIG. 11 illustrates on-screen images of which peak luminance is adjusted according to background complexity in the transparent display device according to an example embodiment of the present disclosure.
Figure 11:
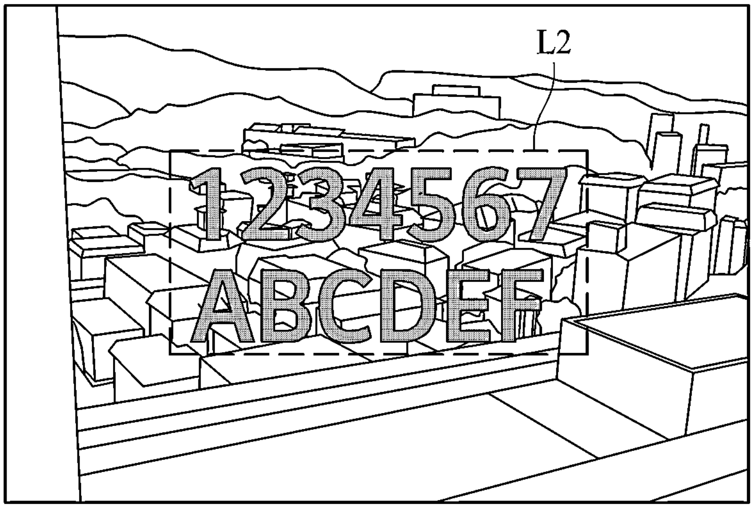

FIG. 11 illustrates on-screen images of which peak luminance is adjusted according to background complexity in the transparent display device according to an example embodiment of the present disclosure.

Referring to FIG. 11, the peak luminance L2 of the on-screen image determined in a complex background 904 is increased in comparison to the peak luminance L1 of the on-screen image determined in a simple background 902 in the transparent display device according to an example embodiment of the present disclosure. Accordingly, it is possible to improve the visibility of on-screen images even in case of the complex background 904 in the transparent display device.

In the transparent display device according to an example embodiment of the present disclosure, the visibility of an on-screen image may be improved by increasing the peak luminance as the background complexity increases, and the power consumption may be reduced by reducing the peak luminance as the background complexity decreases.

Figure 12:
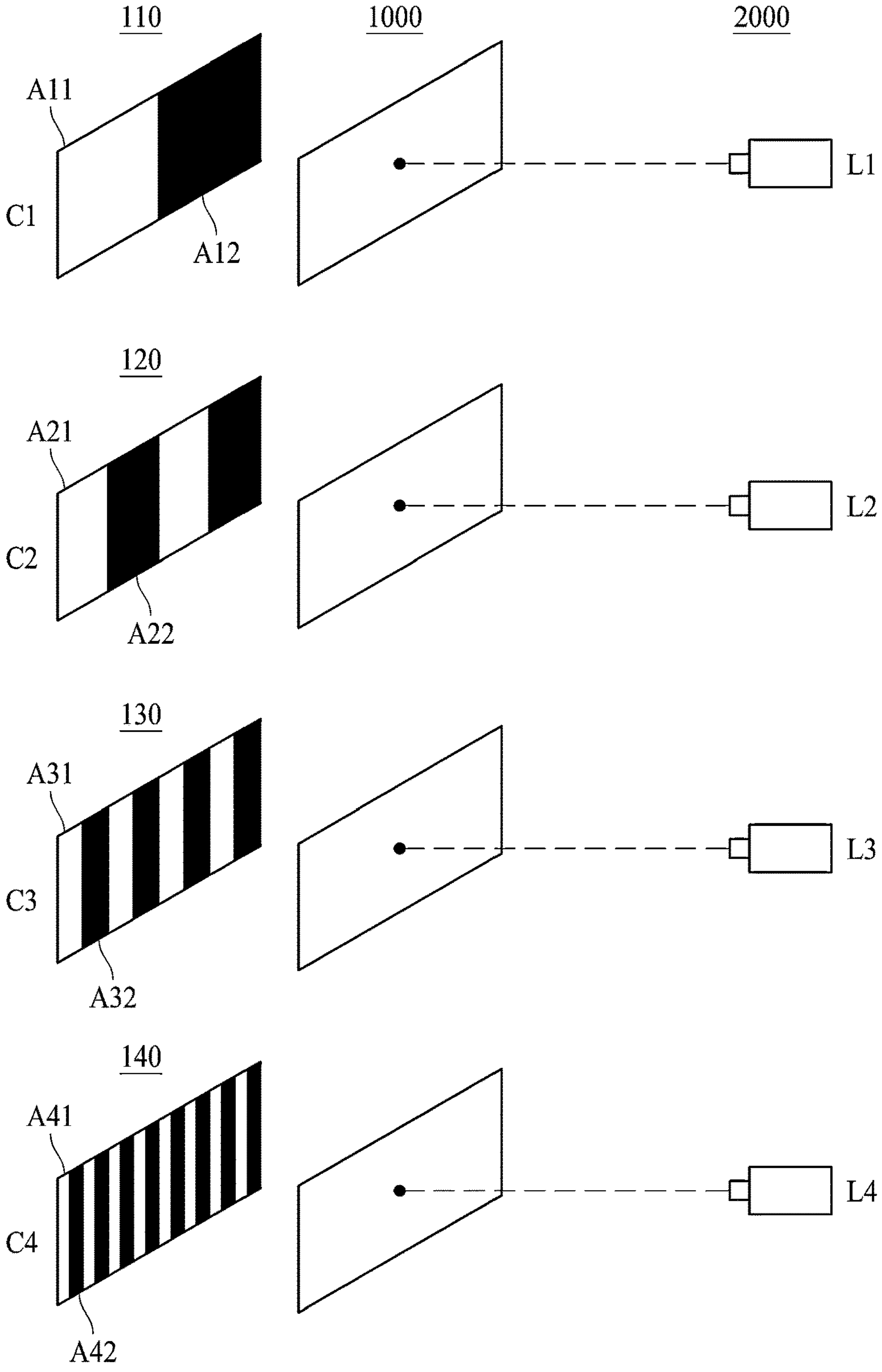
FIG. 12 illustrates a method of determining whether the peak luminance of an on-screen image is required to be adjusted according to the background complexity in the transparent display device according to an example embodiment of the present disclosure.
Figure 13A:
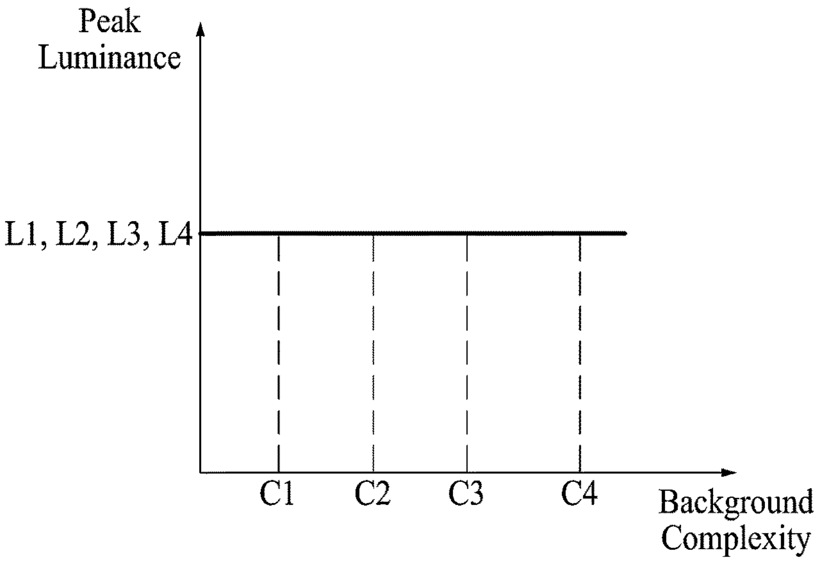
FIG. 13A RELATED ART
FIGS. 13A and 13B are graphs illustrating a relationship between the background complexity and the peak luminance in the transparent display device according to an example embodiment of the present disclosure as compared to a comparative example of the related art.
Figure 13B:
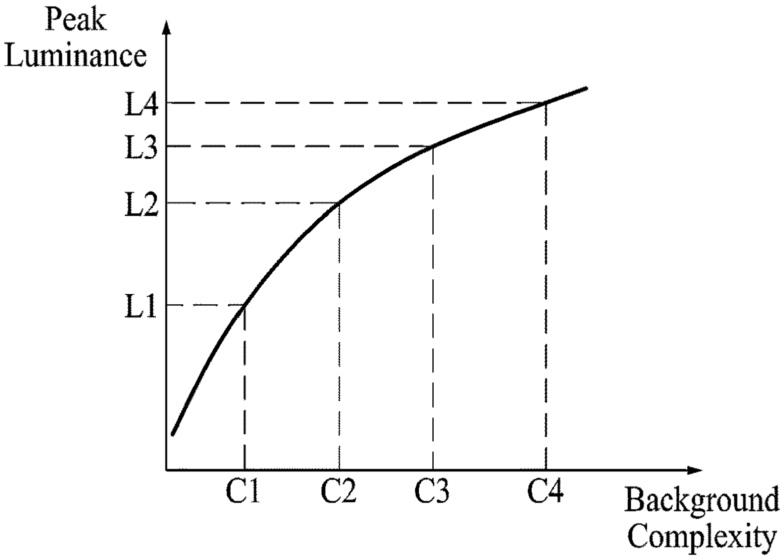

FIG. 12 illustrates a method of determining whether the peak luminance of an on-screen image is required to be adjusted according to the background complexity in the transparent display device according to an example embodiment of the present disclosure, and FIGS. 13A and 13B are graphs illustrating a relationship between the background complexity and the peak luminance in the transparent display device according to an example embodiment of the present disclosure as compared to the comparative example of the related art.

Referring to FIG. 12, the transparent display device 1000 may display a test image (e.g., a white image) supplied from an inspection apparatus. The peak luminance L1, L2, and L3 of the transparent display device 1000 may be measured using a measurement apparatus 2000 while changing background images 110, 120, and 130 having different complexities C1, C2, and C3 at or on the rear of the transparent display device 1000.

The first background image 110 may have a first complexity C1 including one white pattern A11 and one black pattern A12. The second background image 120 may have a second complexity C2 including two white patterns A21 and two black patterns A22 alternately disposed, wherein the second complexity C2 is greater than the first complexity C1. The third background image 130 may have a third complexity C3 including four white patterns A31 and four black patterns A32, wherein the third complexity C3 is greater than the second complexity C2.

Referring to FIG. 13A, in case of the transparent display device according to the comparative example of the related art, even though the complexity C1, C2, and C3 of the background image 110, 120, and 130 increases, the peak luminance L1, L2, and L3 measured using the measurement apparatus 2000 is the same.

On the other hand, referring to FIG. 13B, in case of the transparent display device 1000 according to an example embodiment of the present disclosure, as the complexity C1, C2, and C3 of the background image 110, 120, and 130 disposed at or on the rear of the transparent display device 1000 increases, the peak luminance of the on-screen image is adjusted, whereby the peak luminance L1, L2, and L3 measured using the measurement apparatus 2000 increases. Accordingly, the inspection apparatus may determine whether or not the transparent display device 1000 according to an example embodiment of the present disclosure is utilized (or applied).

Figure 14:
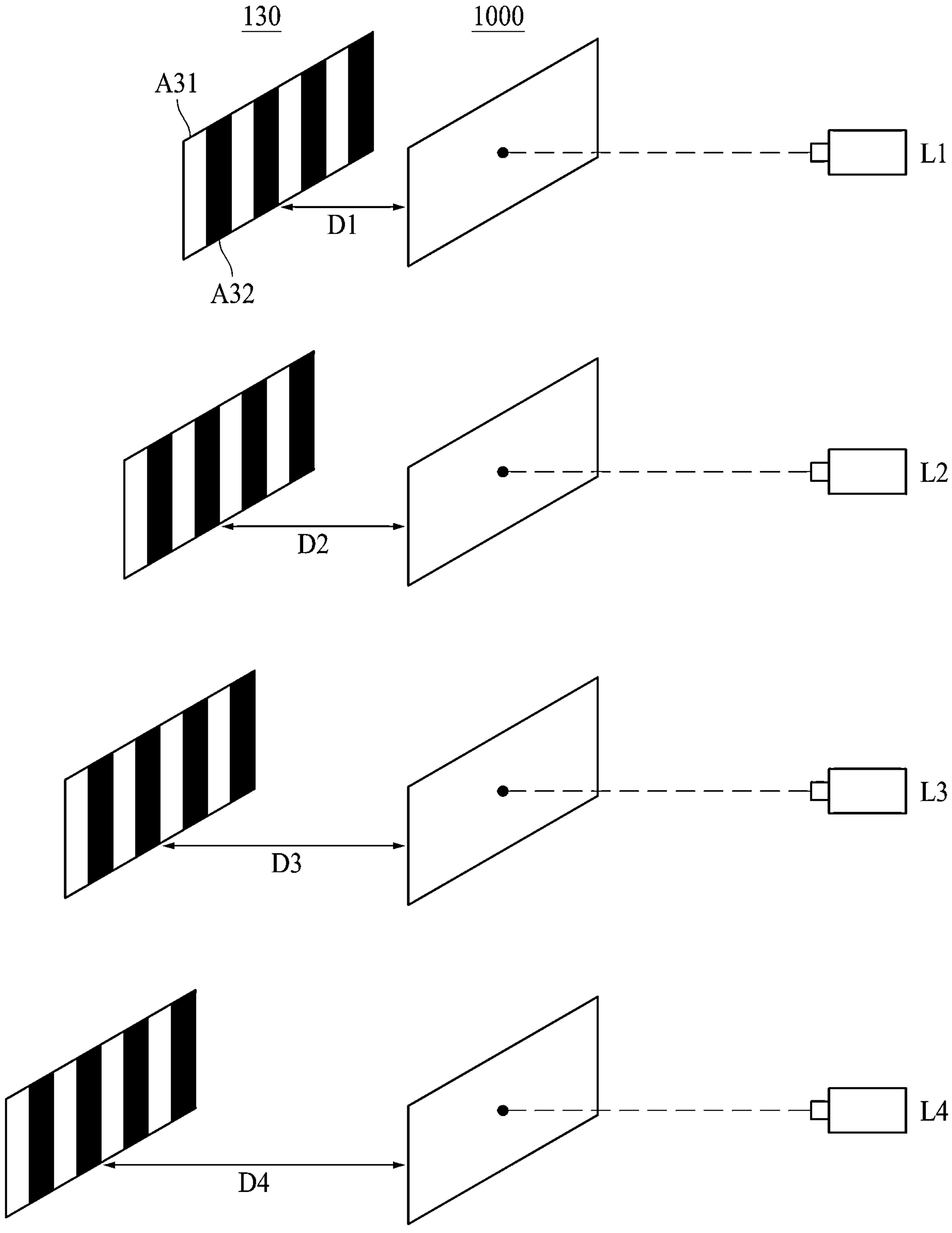
FIG. 14 illustrates a method of determining whether the peak luminance of an on-screen image is required to be adjusted according to the background distance in the transparent display device according to an example embodiment of the present disclosure.
Figure 15A:
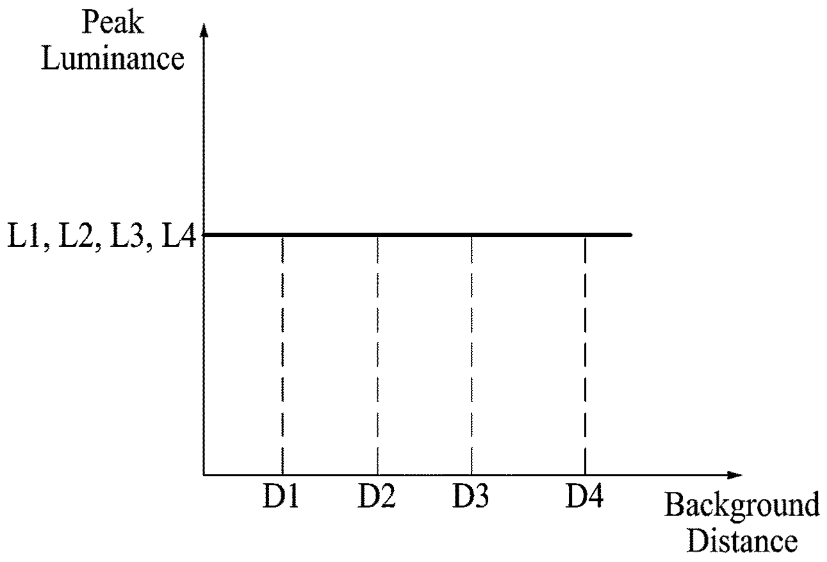
FIG. 15A RELATED ART
FIGS. 15A and 15B are graphs illustrating a relationship between the background distance and the peak luminance in the transparent display device according to an example embodiment of the present disclosure as compared to a comparative example of the related art.
Figure 15B:
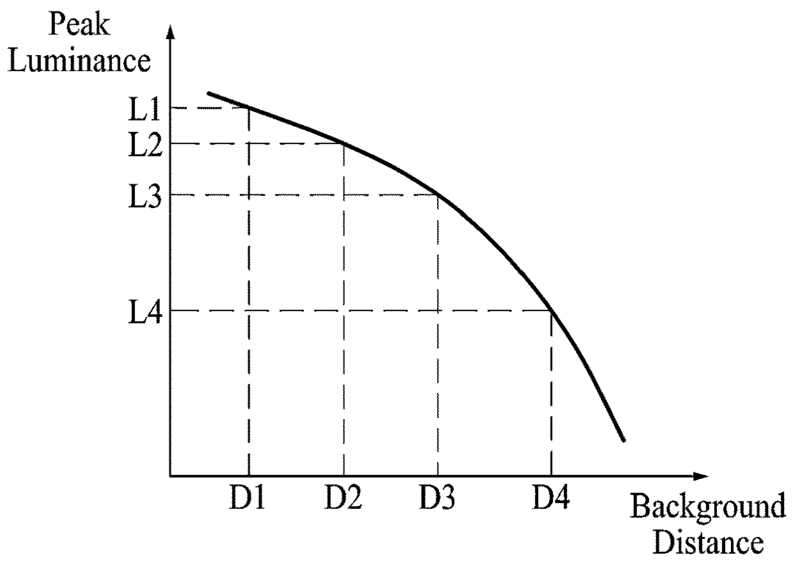

FIG. 14 illustrates a method of determining whether the peak luminance of an on-screen image is required to be adjusted according to the background distance in the transparent display device according to an example embodiment of the present disclosure, and FIGS. 15A and 15B are graphs illustrating a relationship between the background distance and the peak luminance in the transparent display device according to an example embodiment of the present disclosure as compared to the comparative example of the related art.

Referring to FIG. 14, the transparent display device 1000 may display a test image (e.g., a white image) supplied from an inspection apparatus. The peak luminance L1, L2, and L3 of the transparent display device 1000 may be measured using a measurement apparatus 2000 while changing the distance D1, D2, and D3 of the same background image 130 at or on the rear of the transparent display device 1000.

Referring to FIG. 15A, in case of the transparent display device according to the comparative example of the related art, even though the distance of the background image 130 increases, the peak luminance L1, L2, and L3 measured using the measurement apparatus 2000 is the same.

On the other hand, referring to FIG. 15B, in case of the transparent display device 1000 according to an example embodiment of the present disclosure, as the distance D1, D2, and D3 of the background image 130 disposed at or on the rear of the transparent display device 1000 increases, the peak luminance of the on-screen image is adjusted, whereby the peak luminance L1, L2, and L3 measured using the measurement apparatus 2000 decreases. Accordingly, the inspection apparatus may determine whether or not the transparent display device 1000 according to an example embodiment of the present disclosure is utilized (or applied).

Figure 16:
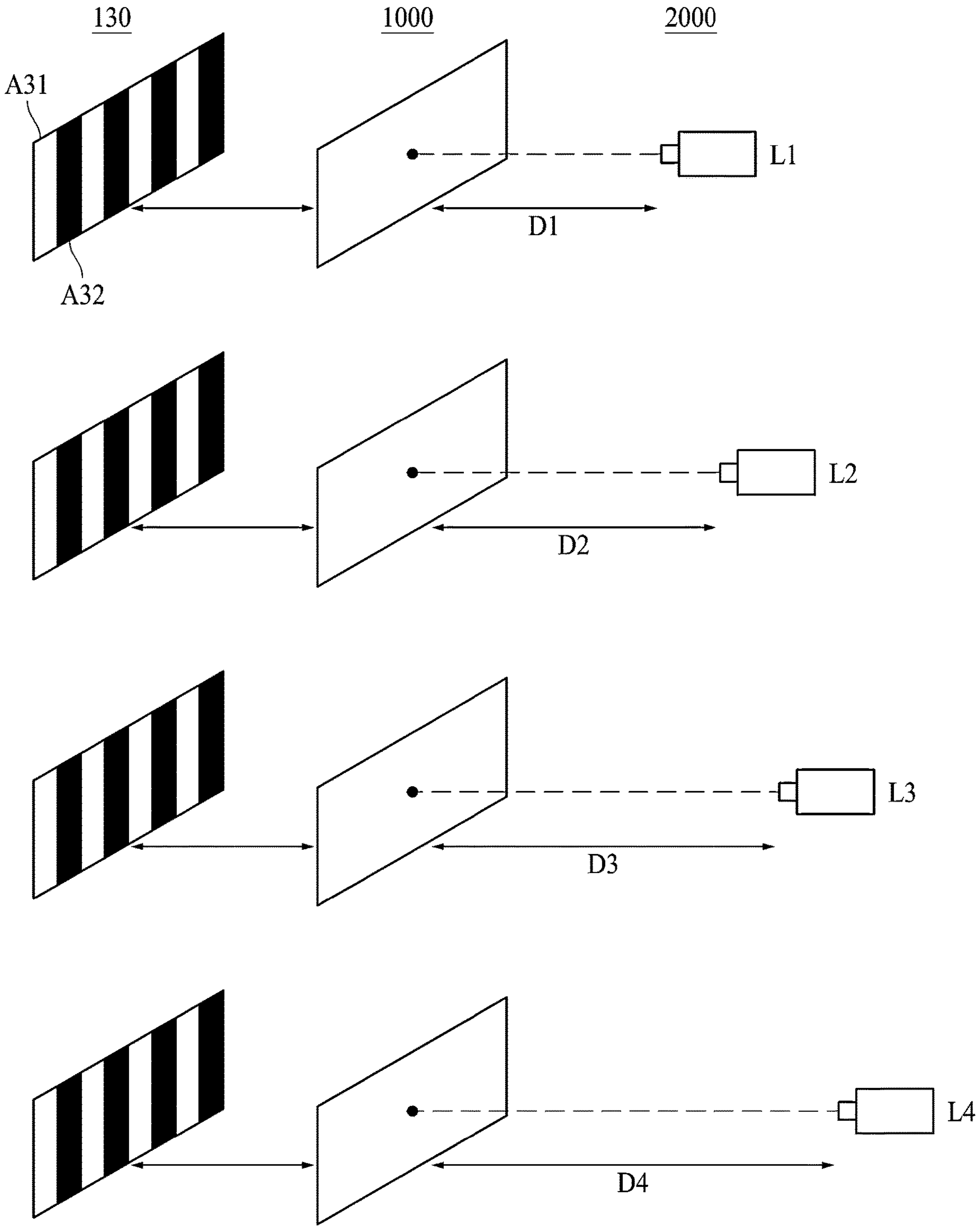
FIG. 16 illustrates a method of determining whether the peak luminance of an on-screen image is required to be adjusted according to the viewing distance in the transparent display device according to an example embodiment of the present disclosure.
Figure 17A:
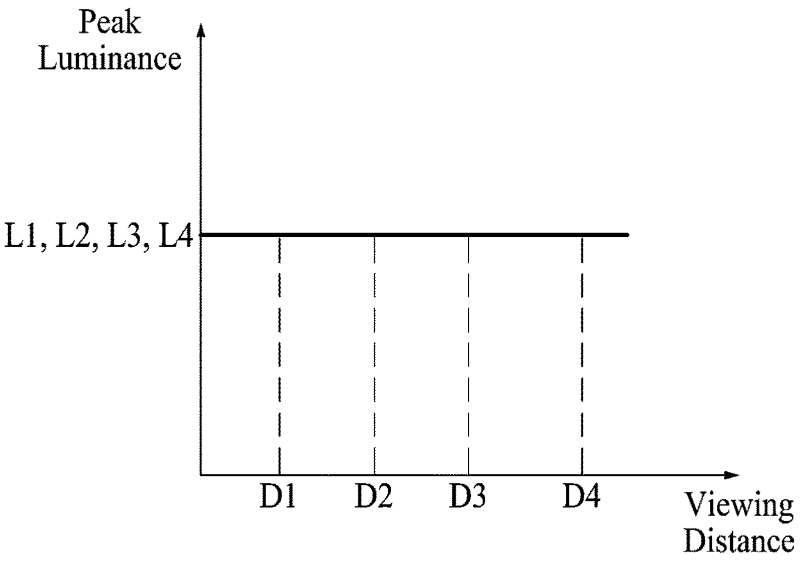
FIG. 17A RELATED ART
FIGS. 17A and 17B are graphs illustrating a relationship between the viewing distance and the peak luminance in the transparent display device according to an example embodiment of the present disclosure as compared to a comparative example of the related art.
Figure 17B:
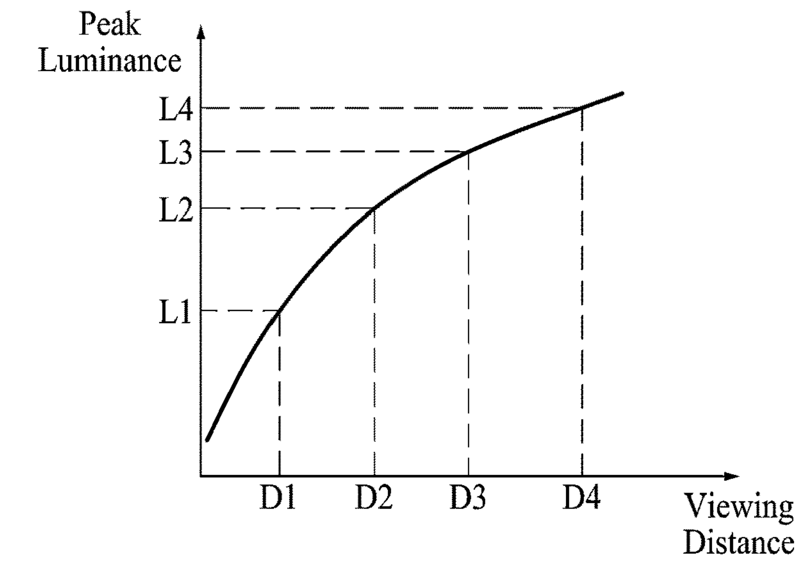

FIG. 16 illustrates a method of determining whether the peak luminance of an on-screen image is required to be adjusted according to the viewing distance in the transparent display device according to an example embodiment of the present disclosure, and FIGS. 17A and 17B are graphs illustrating a relationship between the viewing distance and the peak luminance in the transparent display device according to an example embodiment of the present disclosure as compared to the comparative example of the related art.

Referring to FIG. 16, the transparent display device 1000 may display a test image (e.g., a white image) supplied from an inspection apparatus. The same background image 130 is disposed behind the transparent display device 1000, and the peak luminance L1, L2, and L3 of the transparent display device 1000 may be measured while changing the measurement distance (viewing distance) D1, D2, and D3 of the measurement apparatus 2000.

Referring to FIG. 17A, in case of the transparent display device according to the comparative example of the related art, even though the measurement distance (viewing distance) D1, D2, and D3 of the measurement apparatus 2000 increases, the peak luminance L1, L2, and L3 measured using the measurement apparatus 2000 is the same.

On the other hand, referring to FIG. 17B, in case of the transparent display device 1000 according to an example embodiment of the present disclosure, as the measurement distance (viewing distance) D1, D2, and D3 of the measurement apparatus 2000 increases, the peak luminance of the on-screen image is adjusted, whereby the peak luminance L1, L2, and L3 measured using the measurement apparatus 2000 increases (decreases). Accordingly, the inspection apparatus may determine whether or not the transparent display device 1000 according to an example embodiment of the present disclosure is utilized (or applied).

As described above, the transparent display device and the driving method thereof according to one or more example embodiments may adjust the luminance thereof by adjusting the peak luminance of the on-screen image displayed on the transparent display panel on the basis of background complexity using at least one of the background image information, background image depth (distance) information, and viewing distance information.

According to one or more example embodiments of the present disclosure, the transparent display device and the driving method thereof may improve the visibility of the on-screen image by increasing the peak luminance of the on-screen image when the background is relatively close and complex.

According to one or more example embodiments of the present disclosure, the transparent display device and the driving method thereof may reduce the power consumption by lowering the peak luminance of the on-screen image when the background is relatively distant and simple.

The transparent display device according to one or more example embodiments of the present disclosure may be utilized in or applied to various electronic devices. For example, the transparent display device according to one or more example embodiments of the present disclosure may be applied to a mobile device, a video phone, a smart watch, a watch phone, a wearable device, a foldable device, a rollable device, a bendable device, a flexible device, a curved device, a navigation system, a vehicle navigation system, a vehicle display device, a television, a wall paper display device, a signage device, and/or a home appliance.

It will be apparent to those skilled in the art that various substitutions, modifications, and variations are possible within the scope of the present disclosure without departing from the spirit and scope of the present disclosure. Therefore, the scope of the present disclosure is represented by the following claims, and all changes or modifications derived from the meaning, range or equivalent concept of the claims should be interpreted as being included in the scope of the present disclosure.

What is claimed is:

1. A transparent display device, comprising:

a display panel including a transmission area and a pixel area;

a sensing device configured to obtain and to supply background image information and background image depth information about a rear background viewed through the transparent display device; and a timing controller configured to generate a background complexity value using the background image information and the background image depth information, and to adjust a peak luminance of on-screen image information displayed on the display panel based on the background complexity value, wherein the timing controller is configured to increase the peak luminance of the on-screen image information as the background complexity value increases.

2. The transparent display device according to claim 1, wherein the sensing device includes:

a first camera configured to obtain the background image information and to provide the background image information to the timing controller; and a second camera configured to obtain the background image depth information for the rear background viewed through the transparent display device and to provide the background image depth information to the timing controller.

3. The transparent display device according to claim 2, wherein:

the background complexity value increases as the background image information increases, and the background complexity value increases as the background image depth information decreases.

4. The transparent display device according to claim 2, wherein the sensing device further includes a distance sensor configured to obtain viewing distance information between the display panel and a viewing point and provide the obtained viewing distance information to the timing controller.

5. The transparent display device according to claim 4, wherein the timing controller is configured to generate the background complexity value using the background image information, the background image depth information and the viewing distance information.

6. The transparent display device according to claim 5, wherein:

the timing controller is configured to increase the peak luminance of the on-screen image information as the background image information increases; and the timing controller is configured to decrease the peak luminance of the on-screen image information as the background image information decreases.

7. The transparent display device according to claim 5, wherein:

the timing controller is configured to increase the peak luminance of the on-screen image information as the background image depth information decreases; and the timing controller is configured to decrease the peak luminance of the on-screen image information as the background image depth information increases.

8. The transparent display device according to claim 5, wherein:

the timing controller is configured to increase the peak luminance of the on-screen image information as the viewing distance information increases; and the timing controller is configured to decrease the peak luminance of the on-screen image information as the viewing distance information decreases.

9. The transparent display device according to claim 5, wherein:

the timing controller is configured to decrease the peak luminance of the on-screen image information as the background complexity value decreases.

10. The transparent display device according to claim 1, wherein:

the timing controller is configured to increase the peak luminance of the on-screen image information as the background image information increases and the background image depth information decreases; and the timing controller is configured to decrease the peak luminance of the on-screen image information as the background image information decreases and the background image depth information increases.

11. The transparent display device according to claim 1, wherein:

the timing controller is configured to decrease the peak luminance of the on-screen image information as the background complexity value decreases.

12. The transparent display device according to claim 1, wherein:

the timing controller is configured to increase the peak luminance of the on-screen image information as the background image information increases; and the timing controller is configured to decrease the peak luminance of the on-screen image information as the background image information decreases.

13. The transparent display device according to claim 1, wherein:

the timing controller is configured to increase the peak luminance of the on-screen image information when the background image depth information decreases; and the timing controller is configured to decrease the peak luminance of the on-screen image information when the background image depth information increases.

14. The transparent display device according to claim 1, wherein:

the transparent display device is configured to operate in any one of an on-screen important mode and a see-through important mode, and the timing controller is configured to adjust the peak luminance of the on-screen image information based on the background complexity value in the see-through important mode.

15. The transparent display device according to claim 1, further comprising:

a light shielding plate disposed on a rear surface of the display panel; and a light shielding plate driver configured to drive the light shielding plate according to a control of the timing controller, wherein the light shielding plate driver is configured to drive the light shielding plate in a light shielding mode when in an on-screen important mode and to drive the light shielding plate in a transmission mode when in a see-through important mode.

16. The transparent display device according to claim 15, wherein the timing controller is configured to adjust the peak luminance of the on-screen image information based on the background complexity value when in the see-through important mode.

* * * * *